United States Patent [19]

von Helmolt

[11] Patent Number: 4,868,897
[45] Date of Patent: Sep. 19, 1989

[54] NETWORK FORMED AS AN OPTICAL HOMODYNE OR HETERODYNE RECEIVER CIRCUIT

[75] Inventor: Clemens von Helmolt, Berlin, Fed. Rep. of Germany

[73] Assignee: Siemens Aktiengesellschaft, Berlin and Munich, Fed. Rep. of Germany

[21] Appl. No.: 138,367

[22] Filed: Dec. 28, 1987

[30] Foreign Application Priority Data

Jan. 19, 1987 [DE] Fed. Rep. of Germany ....... 3701351

[51] Int. Cl.$^4$ ............................................. H04B 9/00
[52] U.S. Cl. ................................... 455/619; 455/612; 455/616; 455/617
[58] Field of Search ............... 455/600, 601, 602, 606, 455/607, 609, 610, 612, 617, 618, 619, 616

[56] References Cited

U.S. PATENT DOCUMENTS

| | | | |
|---|---|---|---|
| 4,730,301 | 3/1988 | McMahon | 455/607 |
| 4,752,120 | 6/1988 | Shimizu | 455/616 |
| 4,775,971 | 10/1988 | Bergmann | 455/619 |

FOREIGN PATENT DOCUMENTS

| | | | |
|---|---|---|---|
| 0240475 | 10/1986 | Australia | 455/600 |
| 0023121 | 1/1986 | Japan | 455/616 |

OTHER PUBLICATIONS

Booth et al, "Temperature Tuning of LiNbO$_3$ Electro-Optic Waveguide TE/TM Mode Convertors", Electronic Letters, vol. 20, No. 25/26, Dec. 6, 1984, pp. 1045–1047.

Hindin, "Integration is on the Way for Fiber Optic Receivers", Electronics, Oct. 9, 1980, pp. 155–160.

Primary Examiner—Robert L. Griffin
Assistant Examiner—Leslie Van Beek
Attorney, Agent, or Firm—Hill, Van Santen, Steadman & Simpson

[57] ABSTRACT

An optical network, particularly fashioned as a homodyne or heterodyne receiver wherein a local oscillator (2) of an optical homodyne or heterodyne receiver comprising an optical wave guide network (1) is isolated from generally anisotropic reflections from the network (1) in order to preserve the stability and tunability of the oscillator (2) and a polarization filter (10), a polarization converter (11) and a phase shifter (12) are successively arranged in the direction of the outgoing optical wave in the beam path of the wave emitted by the oscillator (2) and reflected by the network (1) for optical homodyne or heterodyne reception.

14 Claims, 4 Drawing Sheets

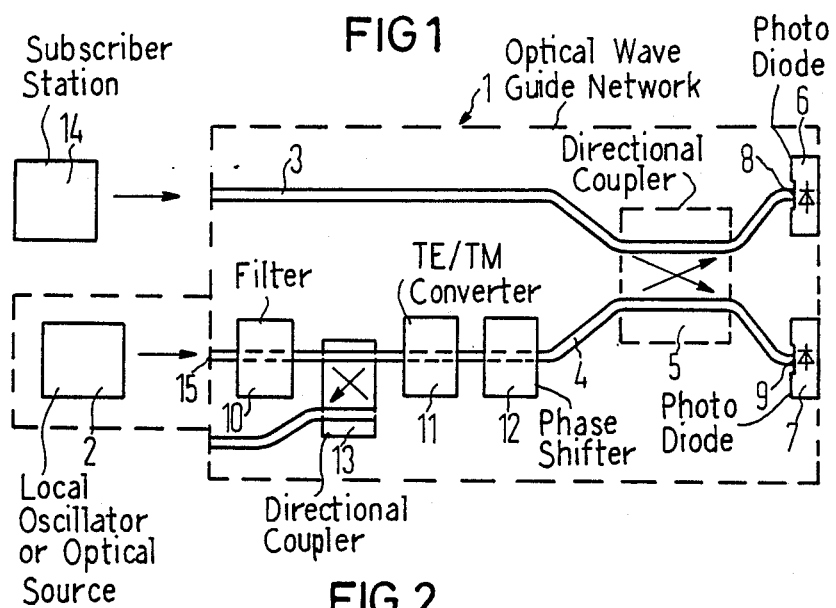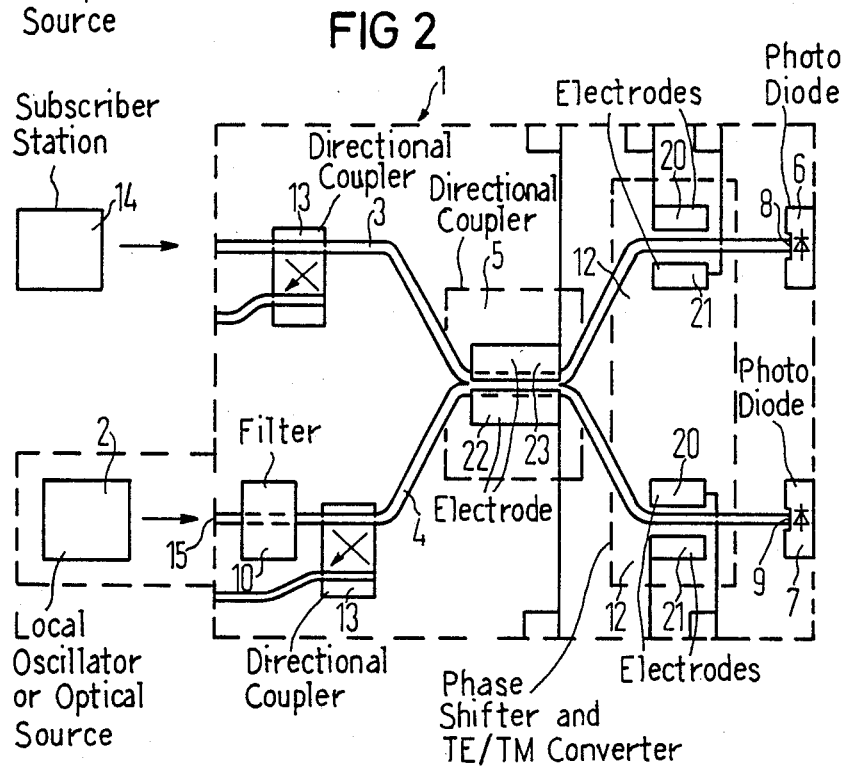

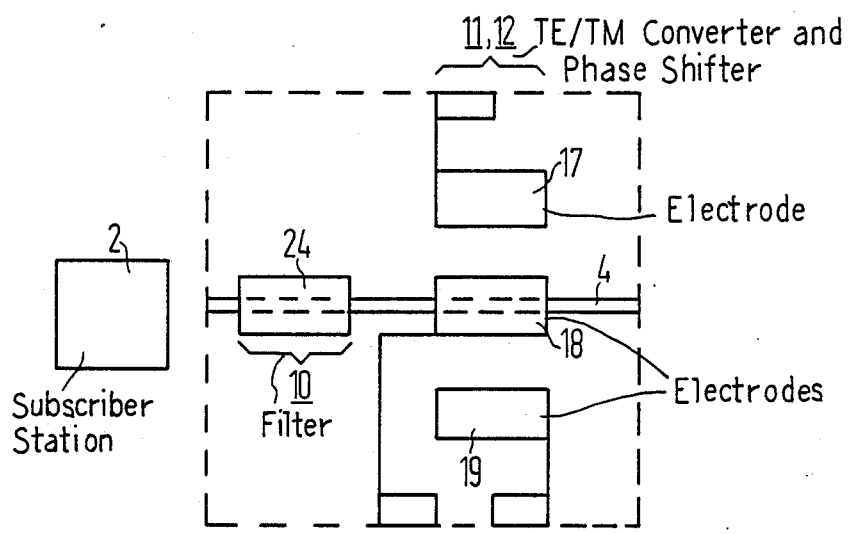
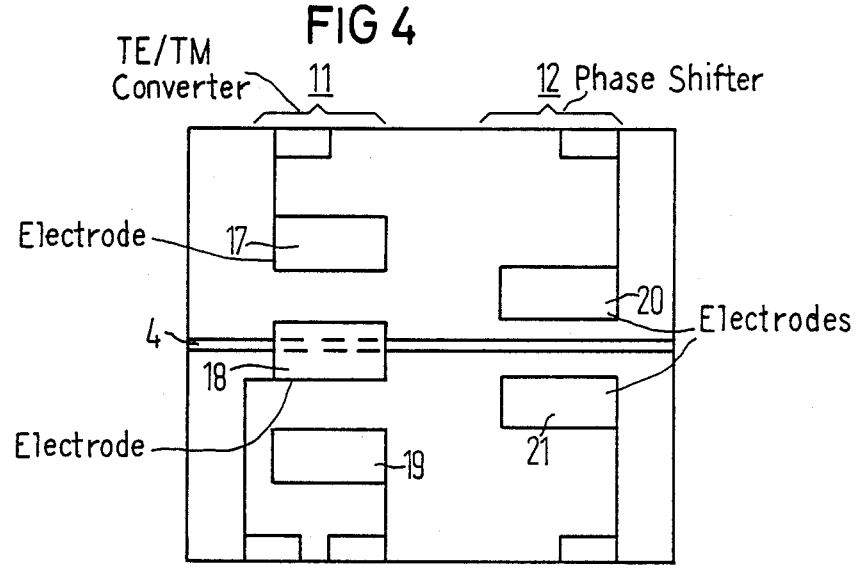

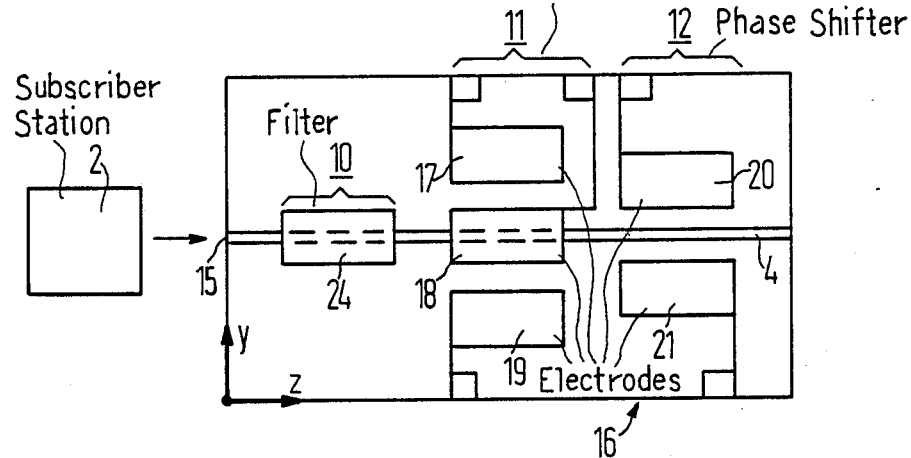
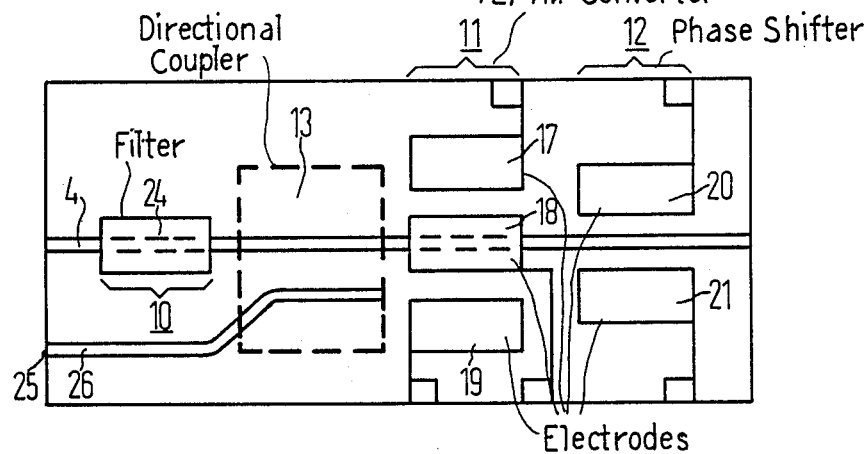

NETWORK FORMED AS AN OPTICAL HOMODYNE OR HETERODYNE RECEIVER CIRCUIT

BACKGROUND OF THE INVENTION

1. Field of the Invention

The invention is directed to a network which is constructed of optical and electro-optical, optically reciprocal elements, and can be coupled to a component which feeds an optical wave into the network, and has locations for effecting anisotropic reflections and has an arrangement of elements which isolates the optical source from anisotropic reflections from the network, particularly, a network formed as an optical homodyne or heterodyne receiver circuit.

2. Description of the Prior Art

It is known in the field of optical communications technology to isolate an optical transmitter from reflections. Such reflections particularly arise at the in-coupling location of a laser into a monomode fiber or into a monomode wave guide. Such reflection locations are essentially polarization-independent and are isotropic in this sense.

As known, for example, a polarization filter and a quarter wave plate which is provided with a perfect anti-reflection layer and—as seen in the direction of the approaching wave—is arranged behind the polarization filter are utilized for isolation from isotropic reflections. A polarized wave approaching the isotropic reflection location departs from the filter linearly polarized in the polarization direction prescribed by the filter, enters into the quarter wave plate linearly polarized and departs from the quarter wave plate circularly polarized. It hits the isotropic reflection location in this manner and returns circularly polarized and orthogonally relative to the approaching wave and, in the course of its further path in the direction opposite the approaching wave, is linearly polarized in the quarter wave plate and is polarized orthogonally relative to the approaching wave at the quarter wave plate. The filter can thus fully control the returning wave, so that the component which transmits the optical wave is protected against such reflections.

This known isolation principle is based on the resulting polarization transformation which is similar to that of a half wave plate and can, when using Jones matrices (CF., in this regard, Journ. of Optical Society of America 31 (1941), pages 488 through 493), be expressed by the equation $$M_Q^T (rI) M_Q = e^{-g} M_H \qquad (1)$$

in which $M_Q$ is the Jones matrix of the quarter wave plate arranged at an angle of 45° relative to the polarization direction of the emitted wave, $M^T_Q$ is the matrix transpose of the the matrix $M_Q$, I is the unit matrix, r is the reflection coefficient, g is a complex exponent, and $M_H$ is the Jones matrix of the half wave plate arranged at the angle of 45° relative to the polarization direction of the emitted wave to obtain:

$$M_Q = \frac{1}{\sqrt{2}} \begin{pmatrix} 1 & -j \\ -j & 1 \end{pmatrix}, \quad M_H = \begin{pmatrix} 0 & -j \\ -j & 0 \end{pmatrix} \qquad (1a)$$

where j denotes the imaginary unit.

For example, an incident horizontally polarized, planar wave is transformed by equation (1) into a reflected wave which is vertically polarized and, which is orthogonally polarized relative to the incident wave.

SUMMARY OF THE INVENTION

It is an object of the invention to provide an optical network which isolates a reflection-sensitive source from anisotropic reflections. The anisotropic reflections can result from anisotropically reflecting locations or can also result from at least two isotropic reflection locations and can be transformed into a resulting, anisotropic reflection. Such phenomena occur in complex networks when optically reciprocal elements are contained therein.

This object is inventively achieved in the invention with a network of the species initially cited which uses:
- a filter for linearly polarized waves,
- a mode coupler, and
- a phase shifter, for reflection isolation of the optical source, whereby the elements effecting the reflection isolation follow the in-coupling location of the optical source as seen in the direction of the progressing, optical wave.

The unexpected results are significant and the surprising overall effect obtainable with the technical teaching of the invention are based on the realization that it is always adequate in optical networks—insofar as these contain only optically reciprocal elements—to provide a polarization filter for linear polarization, a controllable mode coupling means and a means for phase shifting in order to insulate the optical components which are to be protected—particularly a semiconductor laser—from anisotropic reflections.

This can be explained in the following manner with reference to the Jones matrices:

When the quarter wave plate is replaced by a suitable compensation means equation (1) can be generalized for isolation of a reciprocal network comprising i coupled, reflecting locations or, respectively, gates, where internal reflection coefficients between these elements disappear;

$$M_C^T \left( \sum_i M_i \right) M_C = e^{-g} M_H, \, i = 1, 2, \ldots, n \qquad (2)$$

where $M_C$ denotes the Jones matrix of the compensation means and $M^i$ denotes symmetrical matrices, and n is an arbitrary, natural number.

The generalization established by equation (2) is possible because the complex, symmetrical matrix $$\sum_i M_i$$

can always be written as a transformation $$M_S^T M_S = \sum_i M_i.$$

The inverse matrix $M_S^{-1}$ exists for optical devices having finite losses, and the solutions of equation (2) is:

$$M_C = M_S^{-1} M_Q e^{-g/2}. \qquad (3)$$

For a network comprising n reciprocal elements which are characterized by Jones matrices $M_{Ni}$ wherein i equals 1, 2, ... n and n is a natural number and to each of which a reflection location identified by a microwave scattering matrix $S_{Ri}$ is allocated—which effects a wave supplied through the appertaining element to the allocated reflection location and which is reflected there again passes through this element-isolation according to equation (2) is obtained:

$$M_i = MT_{Ni}^T S_{Ri} M_{Ni}, \quad i = 1, 2, \ldots n \quad (4)$$

where the $S_{Ri}$ are symmetrical because of the assumed reciprocity, i.e. $S_{Ri}$ equals $S_{Ri}^T$ applies. Each matrix $S_{Ri}$ can characterize an isotropic reflection but, in particular, can also characterize an anisotropic reflection. The matrices can all differ from one another. Thus, a reciprocal optical network, particularly a network comprising anisotropically reflecting locations, can be compensated with a single arrangement that is characterized by a Jones matrix $M_C$ according to equation (3).

In equations (2) and (3), the exponent g is composed of an attenuation term a, and of a phase term $\phi$ according to $g = a + j\psi$. Thus, every reciprocal means having a Jones matrix $M_C$ according to equation (3) wherein a and $\psi$ are continuously variable can be employed as an arrangement for isolating an arbitrary optical network having a Jones matrix $$\sum_i M_i.$$

Proceeding on the basis of equation (3) the Jones vectors of the required polarization states occur at $J_1 = M_C \cdot H$ or, respectively, $J_2 = M_C \cdot V$, whereby $$H = \begin{pmatrix} 1 \\ 0 \end{pmatrix}$$

or, respectively, $$V = \begin{pmatrix} 0 \\ 1 \end{pmatrix}$$

are the Jones vectors of the horizontally or, respectively, of the vertically polarized waves. The reflected wave is then orthogonally polarized relative to the approaching wave so that as pointed out above influencing of the mode coupling and the phase shift are adequate.

Two preferred possibilities are possible with the invention with respect to the control of the mode coupling. To this end a reciprocal TE/TM converter can be provided or a reciprocal directional coupler—which is already required in the optical network for other purposes can be formed as a controllable component.

Independently, it is extremely advantageous for embodiments of the invention to provide a directional coupler immediately preceding the mode coupling means as seen in the direction of approaching waves, with the directional coupler at this location enabling the monitoring of the amplitude of the returning wave and the control of the orthogonally of the outgoing and of the returning waves.

Further embodiments of the invention are based on the described principles and are directed at executions of monolithic, integrated components. The main manner in which the appertaining components to be integrated can be respectively combined depends upon the substrate material required. Insofar as lasers and photodiodes are to be monolithically integrated with other components, this means that semiconductive, electro-optical material is required. Otherwise, dielectric, electrooptical material, particularly lithium niobate—LiNbO$_3$—is also employed as the most widespread material currently in use.

The configurations of monolithic components can be undertaken from a number of economic points of view, for example, the need of individual integration types by combining them to form hybrid formats and the like, as well as to other criteria. However, elements having inter-related functions—particularly for mode coupling and phase shifting—should not be separated insofar as possible.

Different embodiments of the invention, including the preferred embodiment to which the claims refer, are schematically shown in the drawings and shall be set forth in greater detail below with reference to the FIGS.

BRIEF DESCRIPTION OF THE DRAWINGS

FIG. 1 is a plan view of an integrated optical homodyne or heterodyne receiver module comprising a local oscilator which is to be isolated from reflections by a filter, a TE/TM converter and a phase shifter;

FIG. 2 is a plan view similar to FIG. 1, comprising a controllable directional coupler;

FIG. 3 is a plan view of a monolithic component comprising a filter and a means for TE/TM conversion and phase shift;

FIG. 4 is a plan view of a monolithic component part comprising separate elements for TE/TM conversion and for phase shift;

FIG. 5 is a plan view of a monolithic component part comprising filter TE/TM converter and phase shifter;

FIG. 6 is a plan view of a monolithic component part comprising filter, directional coupler with monitor output, TE/TM converter and phase shifter;

DESCRIPTION OF THE PREFERRED EMBODIMENTS

Figure 7:
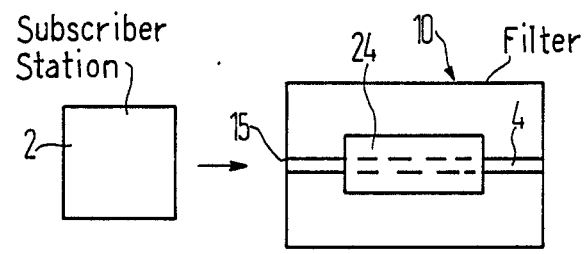
FIG. 7 is a plan view of a hybrid format of a local oscillator and of a filter.

The optical homodyne or heterodyne receiver of FIG. 1 is constructed as an optical waveguide network 1 comprising optically reciprocal components and includes the local oscillator 2 which is coupled to network 1 and two photodiodes 6, 7 which are optical detectors or, respectively, opto-electrical transducers. The network 1 contains two strip waveguides 3 and 4 which, for example, are coupled to one another by an optical directional coupler 5. The local oscillator 2 feeds its output optical wave at the in-coupling location 15 into the waveguide 4. The received, optical signal travels into the waveguide 3 of the optical receiver from a transmitter, for example, a subscriber station 14, lying at a remote position.

The coupling locations of the wave guides 3, 4 to the photodiodes 6, 7 are reflection locations 8, 9 where the outgoing optical waves are reflected. These generally involve anisotropically reflecting locations (see IEEE Journ. of Quantum Electr. WE-8 (1972), pages 470 through 476).

For the purpose of isolating the local oscillator 2 from reflections occurring in the network 1, particularly at the locations 8 and 9, an arrangement is provided at the waveguide 4, which is a filter 10 for linear polarization, a TE/TM converter 11 and a phase shifter 12 arranged in the direction of the outgoing wave, i.e., from the in-coupling location 15 to the reflection locations 8 and 9.

The isolating effect of this arrangement can be explained as follows.

The returning, reflected wave should not exist at the in-coupling location 15. This is possible when the outgoing wave and the returning wave are linearly polarized between the filter 10 and the mode coupler and have polarization states which are orthogonal relative to one another. This condition is achieved with the TE/TM converter 11 and the phase shifter 12 which can transform a linear polarization state into any arbitrary, elliptical polarization state. One of the two possible eliptical polarization states $J_1$ and $J_2$ is obtained at the output of the phase shifter which is the input of the remaining network with the elements, so that the reflected wave is orthogonally polarized relative to the outgoing wave. These two polarization states $J_i (i=1, 2)$ are distinguished in that either left handed circular or, respectively, right handed circular polarization occur in a symmetry plane of the optical network which exists with respect to the outgoing and returning waves in the waveguide 4 but these need not necessarily be physically accessible. These polarization states $J_i$ are mathematically characterized by $J_1 = M_C \cdot H$ and, respectively, $J_2 = M_C \cdot V$, whereby H equals $$\begin{pmatrix} 0 \\ 1 \end{pmatrix}$$

or, respectively, $$V = \begin{pmatrix} 0 \\ 1 \end{pmatrix}$$

denote the Jones vectors of the horizontal or, respectively, vertical linear polarization. Outgoing and returning wave are elliptically polarized between the phase shifter 12 and the reflection location 9 but are generally not orthogonal.

FIG. 1 is also intended to illustrate that the overall optical network 1—potentially including the local oscillator 2 can be formed as a monolitically integrated component.

The embodiment of the invention shown in FIG. 2 differs from that shown in FIG. 1 in that the mode coupling function is co-executed by a modified directional coupler 5 which is formed as an electrically controllable component for this purpose and is provided with electrodes 22, 23.

At least at the waveguide 4, the phase shifter 12 comprising electrodes 20, 21 is also located between the directional coupler 5 which control in the mode coupling and has electrodes 22, 23 and appertaining photodiodes 6 or, respectively, 7. This configuration can also be fashioned as a monolithic, integrated component with or without the local oscillator 2.

The embodiments according to FIGS. 1 and 2 also contain a directional coupler 13. In the embodiment of FIG. 1, this coupler 13 is arranged between the filter 10 and the TE/TM converter 11 and is formed as a mode splitter. Such a mode splitter is constructed like a directional coupler, i.e., is provided with a waveguide 26 which is coupled to the waveguide 4 and thus offers an output for the connection of a monitor or for receiving a control variable for setting the mode coupling and phase shift. In the embodiment of FIG. 2, the coupler 13 can be arranged both at the waveguide 3 as well as at the waveguide 4, either preceding or following the polarization filter 10. FIG. 3 shows a modification of the invention for the isolation of the local oscillator 2 from reflections deriving from the network 1 (not shown).

This modification can be formed as a monolithic component and contains the filter 10 formed as a metal layer 24 above the waveguide 4 and which, due to different optical attenuation of the TE and TM components, allows the TE component of a linearly polarized, optical wave to pass to the waveguide 4 and also contains a component 11, 12 which effects both the TE/TM conversion as well as the phase shift. A covering electrode 18 and two flanking electrodes 17 and 18 are provided for the waveguide 4 for this purpose. In view of the optical attenuation of a metal layer, at least the covering electrode 18 is formed of an electrically conductive, optically transparent material. For example, lithium niobate $LiNbO_3$ can be employed as the substrate material for such a configuration without an electro-optical or, respectively, an opto-electrical transducer.

FIG. 4 shows a monolithic component comprising a TE/TM converter 11 and a phase shifter 12 for the wave which is guided in the waveguide 4. Separately from one another, a vertical electrical field is generated for the TE/TM conversion and a horizontal electrical field is generated for the phase shift.

The embodiment of the arrangement for reflection isolation for an optical network according to FIG. 1 shown in FIG. 5 is integrated on a $LiNbO_3$ substrate 16 cut in the x-direction. The waveguide 4 is composed of a Ti-diffused monomode strip waveguide 4 extending in the z-direction on which the polarization filter 10 and the means 11, 12 are applied. The length of the waveguide 4 is about 3 cm. A local oscillator 2 in the form of a HLP 5400 laser diode is butt-coupled thereto.

The means for mode coupling is composed of an electrooptical polarization converter, specifically, a TE/TM converter 11 and an electro-optical phase shifter 12, which are both reciprocal elements. The polarization converter is arranged between the polarization filter 10 and the phase shifter 12 and, for example, contains three electrodes 17, 18 and 19 extending in the longitudinal direction of the waveguide 4. One of these electrodes, for example the electrode 18, covers the waveguide 4; the other two are arranged at both sides of the waveguide 4 as flanking electrodes 17 and 19. The polarization conversion results by applying voltages to the three electrodes 17, 18 and 19. The phase shifter 12 is composed of the two flanking electrodes 21 and 22 which extend in the longitudinal direction of the waveguide 4 and are arranged at both sides thereof. By applying voltages to these electrodes, the phase relationship of a wave traveling in the waveguide 4 can be influenced.

The means for reflection isolation in the arrangement shown in FIG. 6 corresponds to the embodiment of the invention according to FIG. 1. Monolithically integratable according to FIG. 6, the polarization filter 10, the directional coupler 13, the TE/TM converter 11 and the phase shifter 12 are combined. The coupling location 25 of the "monitor" waveguide 26 should be provided with an anti-reflection layer and/or the coupling between the waveguides 4 and 26 should be low in order to avoid disturbing reflections from occurring.

Figure 8:
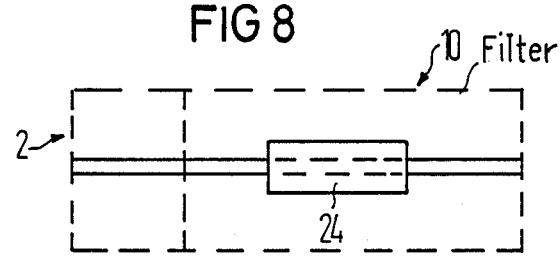
FIG. 8 is a plan view of a means corresponding to FIG. 7, however, as a monolithic component part.

FIGS. 7 and 8 show arrangements of a polarization filter 10 and of the local oscillator 2 as individual, hybrid combinable components (FIG. 7) or, respectively, monolithically integrated on electro-optical semiconductor material (FIG. 8). The incoupling location 15—and, thus, one reflection location can be avoided in the embodiment of FIG. 8. On the other hand, for example, the interchangeability of the laser 2 is deteriorated since this must be obtained from the supplier together with the appertaining polarization filter 10.

Figure 9:
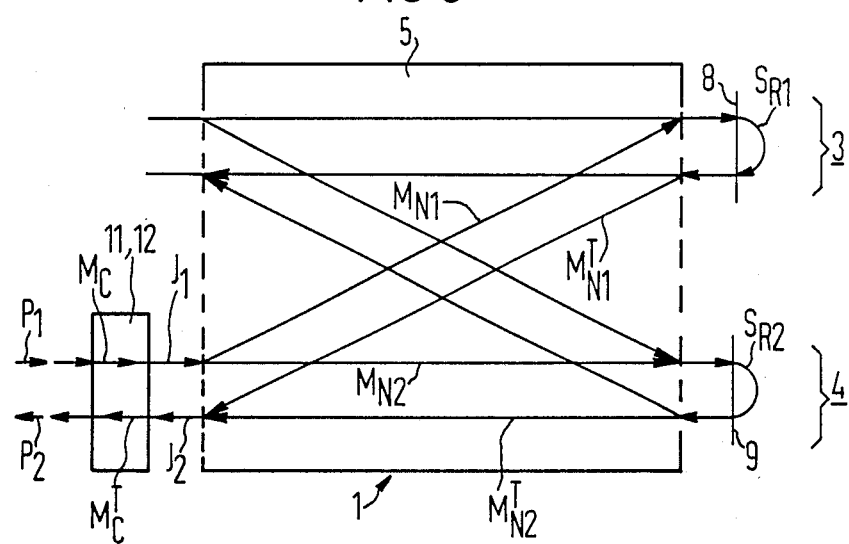
FIG. 9 is the equivalent Jones vector diagram of the receiver of FIG. 1 without local oscillator and polarization filter.

FIG. 9 shows the Jones vector diagram equivalent for the network 1 and the arrangement for reflection isolation wherein the arrows in the elements represent the Jones matrices $M_{N1}$ and $M_{N2}$ or, respectively, the transposed Jones matrices $M_{N1}^T$ and $M_{N2}^T$. The arrows between the elements represent Jones vectors, particularly the vectors $J_1$ and $J_2$ between the components 11, 12 for reflection isolation and the directional coupler 5. The reflection locations 8 and 9 are represented by the microwave scattering matrices $S_{R1}$ or, respectively, $S_{R2}$ of the optical waves.

According to the above equation (2), isolation is obtained with $$M_i = M_{Ni}^T S_{Ri} M_{Ni} \text{ with } i=1, 2$$

The Jones matrices $M_C$ of the arrangement 11, 12 must satisfy equation (3). It is thereby assumed that the isolation occurs as compensation. However, orthogonality of the polarization states suffices for isolation of the returning wave from the outgoing wave. When the wave outgoing through the polarization filter supplied to the network 1 has the polarization state Pl, then the wave reflected from the network 1 and returning from the arrangement 11, 12 has the polarization state P2 orthogonal relative to the state Pl which is blocked by the polarization filter.

On the basis of the above-described isolation principle, the local oscillator laser 2 of an optical homodyne or heterodyne receiver can be isolated from reflections, so that its stability and tunability are preserved. The isolator itself can be integrated together with an optical homodyne or, respectively, heterodyne receiver.

Although the invention has been described with respect to preferred embodiments, it should not be so limited as changes and modifications can be made which are within the full intended scope of the invention as defined by the appended claims.

I claim:

1. An optical network comprising, a substrate, a coupler, first and second strip waveguide mounted generally parallel to each other on said substrate and coupled together by said coupler, an optical source connected to a first end of said first strip waveguide, a first photodiode connected to the second end of said first strip waveguide and a second photodiode connected to the second end of said second strip waveguide, a subscriber station connected to the first end of said second strip waveguide, a filter connected to said first strip waveguide and mounted between said coupler and said optical source, a phase shifter connected to said first strip waveguide and mounted between said optical source and said first photodiode, and a mode coupler through which said first strip line extends mounted between said filter and said phase shifter.

2. A network according to claim 1 wherein said mode coupler is formed as a controllable TE/TM converter (11).

3. A network according to claim 2, wherein said TE/TM converter (11) and said phase shifter (12) are formed as a monolithic component.

4. A network according to claim 2, wherein said filter (10), said TE/TM converter (11) and said phase shifter (12) are formed as a monolithic component.

5. A network according to claim 2 wherein said optical source (2) is a laser, and said filter, said TE/TM converter (11), said phase shifter (12) and said photodiodes (6,7) are formed as a monolithic component on said substrate (16).

6. A network according to claim 1, wherein said mode coupler is formed as a first directional coupler (5) so as to superimpose the optical waves travelling in each strip wave guides (3, 4), and first and second electrodes (22, 23) for controlling the mode coupling between optical waves passing through said first and second strip lines in opposite directions.

7. A network according to claim 2 or 6, comprising an additional directional coupler (13) coupled to said first stripline and which has a third stripline which can supply an output or receive an input.

8. A network according to claim 7, wherein said filter (10), said directional coupler (13), said TE/TM converter (11) and said phase shifter (12) are formed as a monolithic component.

9. A network according to claim 7, wherein said filter (10), said additional directional coupler (13), said first directional coupler (5) and said first and second electrodes (22, 23) and said phase shifter (12) are formed as a monolithic component.

10. A network according to claim 6, wherein said directional coupler (5) said first and second electrodes (22, 23) and said phase shifter (12) are formed as a monolithic component.

11. A network according to claim 6, wherein said filter (10), said directional coupler (5) and said first and second electrodes (22, 23) and said phase shifter (12) are formed as a monolithic component.

12. A network according to claim 6 wherein said optical source is a laser, said filter (10), said additional directional coupler (13), said first directional coupler (5) and said first and second electrode (22, 23), said phase shifter (12) and said first and second photodiodes (6, 7) are formed as a monolithic component on said substrate.

13. A network according to claims 3 or 4 or 5 or 10 or 11 wherein said substrate is made of lithium niobate ($LiNbO_3$).

14. A network according to claim 3 or 11, wherein said optical source and said filter (10) are formed as a monolithic component on said material.

* * * * *